(12) United States Patent
Kern et al.

(10) Patent No.: US 12,474,576 B2
(45) Date of Patent: Nov. 18, 2025

(54) LOCAL DIMMING OF MIXED REALITY GLASSES IN MEDICAL ENVIRONMENT

(71) Applicant: Brainlab AG, Munich (DE)

(72) Inventors: Laura Kern, Munich (DE); Daniel Wilmes, Munich (DE); Julia Doerner, Munich (DE)

(73) Assignee: BRAINLAB AG, Munich (DE)

( * ) Notice: Subject to any disclaimer, the term of this patent is extended or adjusted under 35 U.S.C. 154(b) by 197 days.

(21) Appl. No.: 18/341,414

(22) Filed: Jun. 26, 2023

(65) Prior Publication Data
US 2024/0427144 A1 Dec. 26, 2024

(51) Int. Cl.
*G02B 27/01* (2006.01)

(52) U.S. Cl.
CPC ....... *G02B 27/0101* (2013.01); *G02B 27/017* (2013.01); *G02B 2027/0118* (2013.01); *G02B 2027/014* (2013.01); *G02B 2027/0178* (2013.01)

(58) Field of Classification Search
CPC .............. G02B 27/0101; G02B 27/017; G02B 2027/0118; G02B 2027/014; G02B 2027/0178
See application file for complete search history.

(56) References Cited

U.S. PATENT DOCUMENTS

| | | | |
|---|---|---|---|
| 2016/0012643 A1* | 1/2016 | Kezele | H04N 13/344 345/633 |
| 2016/0155267 A1 | 6/2016 | Bean | |
| 2017/0277256 A1* | 9/2017 | Burns | G06F 3/013 |
| 2017/0301145 A1* | 10/2017 | Miller | G09G 5/14 |
| 2020/0311396 A1* | 10/2020 | Pollefeys | G06T 19/20 |
| 2021/0141229 A1 | 5/2021 | Mathur | |
| 2022/0050295 A1* | 2/2022 | Russell | G02F 1/134309 |

FOREIGN PATENT DOCUMENTS

| | | |
|---|---|---|
| WO | 2016151506 A1 | 9/2016 |
| WO | 2020209624 A1 | 10/2020 |

* cited by examiner

*Primary Examiner* — Cory A Almeida
(74) *Attorney, Agent, or Firm* — Gray Ice Higdon

(57) ABSTRACT

The disclosed method encompasses performing local dimming of a dimmed area within a display area of mixed reality glasses. The dimmed area comprises a part of the display area on which a virtual object is displayed. While local dimming increases perceptibility of the virtual object, it might impair usability since it blocks real world objects from view. This is avoided by reducing a dimming intensity of the local dimming in at least a part of the dimmed area.

13 Claims, 5 Drawing Sheets

LOCAL DIMMING OF MIXED REALITY GLASSES IN MEDICAL ENVIRONMENT

FIELD OF THE INVENTION

The present invention relates to a method of controlling local dimming of mixed reality glasses, a corresponding computer program, a computer-readable storage medium storing such a program and a computer executing the program, as well as a system comprising the aforementioned computer and mixed reality glasses.

TECHNICAL BACKGROUND

Mixed reality (MR) glasses, sometimes also referred to as extended reality glasses or augmented reality glasses, or simply as glasses, are recently used in medical environments. A user, who is wearing the glasses, sees the physical environment, or real world, around him through the glasses. Additional information is added to the user's field of view. The additional information is typically computer-generated, and the glasses overlay the additional information over the light emitted by the surrounding of the user and passing through the glasses into the user's eye(s). All or a part of the surface of lenses of the glasses directed towards the user is a display area on which the glasses can display the additional information.

The additional information sometimes comes in the form of a virtual object. The virtual object is for example a computer-generated object being overlaid by the glasses such that the user has the impression that the virtual object is located in the space surrounding him.

Mixed reality glasses thus blend, or mix, two images. One image is a real image, formed by incident light emitted by the real world and passing through the glasses. The other image is a virtual image representing the additional information. The virtual image has a virtual image layer, which can be the layer of a transparent display of the MR glasses used for generating the virtual image or the surface on which the virtual image is projected within the MR glasses.

Some glasses comprise a dimming function to reduce the transparency of the glasses. This reduces the amount of light falling through the glasses into the user's eye(s). In other words, the brightness of the real image is reduced. This is helpful in bright environments, for example for increasing visibility of the additional information. This aspect is for example referred to as dynamic dimming. The reduction of transparency, which means the opacity, can typically be set, for example between no opacity and the maximum possible opacity.

Some glasses, like the MR glasses by different manufacturers, even provide local dimming. While dynamic dimming reduces the transparency of the complete display area of the glasses, local dimming, or segmented dimming, can define a sub-area of the display area, and only a part of the glasses corresponding to the sub-area is dimmed. With this, the background of an area on which additional information is displayed can be dimmed to increase perceptibility of the additional information. The area which is dimmed is referred to as dimmed area.

Local dimming is typically controlled by means of an array of segments in analogy to pixels of conventional image data. The dimmed area is thus defined by the segments for which dimming is activated. The dimming segments are typically arranged in a dimming layer of the MR glasses. The dimming layer is placed behind the virtual image layer as seen by the user. The local dimming resolution, which is the resolution with which the opacity can be set, is currently smaller than the display resolution with which the additional information is displayed. In other words, the segments of the local dimming are larger than the pixels of the virtual image. But this might change in the future.

The present invention aims at improving the usability of MR glasses when additional information is provided.

The present invention can be used for any Mixed Reality application. Examples of such Brainlab AG products include, but are not limited to, Mixed Reality Viewer 5.4 and Mixed Reality Spine Navigation 1.0.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

In the following, a short description of the specific features of the present invention is given which shall not be understood to limit the invention only to the features or a combination of the features described in this section.

The disclosed method encompasses performing local dimming of a dimmed area within a display area of mixed reality glasses. The dimmed area comprises a part of the display area on which a virtual object is displayed. While local dimming increases perceptibility of the virtual object, it might impair usability since it blocks real world objects from view. This is avoided by reducing a dimming intensity of the local dimming in at least a part of the dimmed area.

In this context, the term "within" does not mean that the display area and the dimmed area lay in the same plane or layer. The dimming layer and the display layer are spaced apart and typically parallel to each other. It rather means that the display area and the dimmed area are overlaying when viewed by the user of the MR glasses.

The dimmed area of the display area means the area for which the background is dimmed by the dimming layer.

GENERAL DESCRIPTION OF THE INVENTION

In this section, a description of the general features of the present invention is given for example by referring to possible embodiments of the invention.

In general, the invention reaches the aforementioned object by providing, in a first aspect, a method of controlling local dimming of mixed reality glasses.

The method involves a step of performing local dimming of a dimmed area. The dimmed area is a part of a display area of the mixed reality glasses which is occupied by a virtual object. The glasses typically have at least one lens, and the virtual object is displayed on the display area of the lens. The display area of a lens is all or a part of the (inner) surface of the lens. The part of the display area which comprises the virtual object is referred to as an object area. The object area has a shape and a size depending on the virtual object.

The dimmed area is for example identical to the object area. However, if the local dimming has a resolution lower than the display resolution, the dimmed area slightly differs from the object area. The dimmed area is for example the smallest possible area that completely comprises the object area. The dimmed area is thus larger than the object area. But the dimmed area could also be smaller than the object area, for example by selecting the dimmed area to include only segments of the dimming layer which are completely covered by the object area.

Performing the local dimming thus causes an opacity of the lens at the dimmed area, thus blocking or reducing incident light depending on the level of opacity. This increases the ratio of the brightness of the virtual image to the brightness of the real image. The visibility of the virtual object increases.

The dimmed area and the object area are aligned such that the object area completely covers the dimmed area, or vice versa, in directions perpendicular to the line of sight of the user. If the lens of the MR glasses is thin, the distance between the dimming layer and the virtual image layer is small, such that there is no noteworthy parallax between said layers. The alignment can then be based on a line of sight central to the lens.

Dynamic dimming can eliminate up to 99.7% of ambient light. The user can easily run into a situation where the dimmed area covers a large section of the MR display. This results in the user not being able to see his surrounding environment appropriately. Consequences include loss of orientation and loss of spatial awareness of objects in close proximity of the user that could lead to bodily harm.

The method therefore further involves the step of reducing a dimming intensity of the local dimming for at least a part of the dimmed area. This has the technical effect that visibility of real objects behind the dimmed area increases, thus eliminating the consequences mentioned above. Reducing the dimming intensity means reducing the opacity of the dimming layer. The part of the dimmed area in which the dimming intensity is reduced is referred to as relief area. The relief area is a sub-area of the dimmed area or the complete dimmed area.

Reducing the dimming intensity has two main aspects. One aspect is avoiding a large dimmed area with high opacity and one aspect is making particular real objects visible. Both aspects can be considered separately or jointly.

In one embodiment, reducing the dimming intensity involves monotonically reducing the dimming intensity with an increasing size of the dimmed area, in particular over the whole dimmed area. The larger the dimmed area is, the more the opacity is reduced because more of the real image is dimmed by the local dimming. A small dimmed area can have large opacity since it does not block much of the real world, but a large dimmed area has a lower opacity to still see the real world through the dimmed area and the virtual object.

Monotonically reducing the dimming intensity can involve an inverse smoothstep function having a dimming strength quotient or the size of the dimmed area on the abscissa and the dimming intensity, or opacity, on the ordinate.

In one embodiment, reducing the dimming intensity involves setting the dimming intensity in a range from 65 percent to 100 percent of a maximum dimming intensity. The maximum dimming intensity is the maximum opacity which can be achieved by the MR glasses. The lower end of 65 percent is a reasonable compromise between the visibility of the virtual object and of the real world behind the virtual object and the dimmed area. The upper end of 100 percent maximizes visibility of the virtual object, which is particularly reasonable for a small virtual object.

Monotonically reducing the dimming intensity, in particular in a range from 65 percent to 100 percent, is particularly reasonable if the relief area is the same as the dimmed area, or has at least 70 percent, 80 percent, 90 percent or 95 percent of the size of the dimmed area.

In one embodiment, the size of the dimmed area is calculated from a distance of the virtual object to the mixed reality glasses and a size of the virtual object. In this context, the size of the virtual object is the virtual size of the virtual object in the real world. The larger the virtual object, the larger the dimmed area and vice versa. The larger the distance, the smaller the dimmed area and vice versa.

The size of the virtual object is for example the product of the maximum height and the maximum width of the virtual object in the vertical and the horizontal direction, respectively. The vertical and horizontal direction are each perpendicular to the line of sight of the user onto the virtual object. In another implementation, the size of the virtual object is the product of the extents of the virtual object in the horizontal and the vertical direction. The extent in the horizontal direction is the horizontal distance between the leftmost point and the rightmost point of the virtual object, and the extent in the vertical direction is the vertical distance between the uppermost point and the lowermost point of the virtual object. The maximum height is always equal to or smaller than the extent in the vertical direction and the maximum width is always equal to or smaller than the extent in the horizontal direction.

The distance between the virtual object and the MR glasses is for example the distance of the closest point of the virtual object to the MR glasses or of the center of the virtual object to the MR glasses.

In one implementation, the size of the dimmed area is determined from a quotient of the distance of the virtual object to the size of the virtual object. This quotient is also referred to as dimming strength quotient. In one particular implementation, the opacity is calculated as $$\frac{distance}{size \times 0.8}.$$

In addition, limits can be applied, such as a minimum opacity of for example 65 percent.

In another implementation, the size of the dimmed area is determined as the number of segments of the local dimming. The opacity can for example correlate to the ratio of the size of the display area to the size of the dimmed area. In addition, limits can be applied, such as a minimum opacity of for example 65 percent.

In one embodiment, the virtual object is a 2D panel. This 2D panel is virtually placed in the real world like a billboard. Information, for example medical information like DICOM data, PDFs, videos or similar healthcare data, can be placed on the 2D panel. Like any virtual object, the 2D panel has a size and a distance to the MR glasses, and the size of the dimmed area can be calculated therefrom. However, the virtual object can be any object, such as any 3D object.

In one embodiment, reducing the dimming intensity involves cutting out a part of the dimmed area which covers an object of interest. An object of interest is an object that should be visible to the user of the MR glasses. Objects of interest for example encompass a hand of the user or a medical instrument. The part of the dimmed area which is cut out is referred to as cut-out part. The cut-out part is typically smaller than the dimmed area. The cut-out part of the dimmed area is the part which covers the object of interest. The cut-out part can comprise multiple independent sections each belonging to an object of interest if there are multiple objects of interest. In parts of the dimmed area other than the cut-out part, the dimming intensity is not reduced or reduced less than in the cut-out part.

Cutting out a part of the dimmed area for example comprises establishing the cut-out part of the dimmed area and reducing the dimming intensity in the cut-out part, wherein reducing the dimming intensity also covers a complete deactivation of the local dimming, which means that the dimming strength is zero.

The cut-out part can for example be determined by image processing of an image captured by a camera of the MR glasses. The image processing involves object recognition to recognize the object of interest in the camera image and transforming the area of the camera image occupied by the object of interest into the dimming layer of the MR glasses as the cut-out part.

In another implementation, the object of interest is tracked, for example using a medical tracking system. The shape of the object of interest is known, for example from a database of objects of interest. The shape of the tracked object of interest is then projected into the dimming layer to define the cut-out part. The projection of the object of interest into the dimming layer can be approximated by a projection into the virtual image layer or a generic plane of the MR glasses.

Tracking is typically performed in a reference system of the tracking system. With a known transformation between the reference system of the tracking system and a reference system of the MR glasses, the position of the tracked object is transformed into the reference system of the MR glasses and the shape of the tracked object of interest can be projected into the dimming layer. In this document, the term "position" means the location in up to three translational dimensions and/or the orientation in up to three rotational dimensions.

In one embodiment cutting out a part of the dimmed area means setting the dimming intensity in the cut-out part of the dimmed area to zero. This means a complete deactivation of the local dimming in the cut-out part. Thus, local dimming does not obstruct the object of interest at all. However, cutting out could alternatively just mean reducing the dimming intensity in the cut-out part.

In one embodiment, cutting out a part of the dimmed area involves placing an imaginary object around the object of interest, calculating a projection of the imaginary object into the dimmed area and reducing the dimming intensity of segments of the dimmed area which correspond to the projection. This reduces the computational complexity, in particular if the imaginary object has a simple shape, for example a geometric shape. The geometric shape of the imaginary object can be a 3D shape, like a cylinder, a sphere or a cuboid, or a 2D shape, like a rectangle, a circle or a polygon. Projecting the imaginary object into the dimmed area means the same as projecting it into the dimming layer.

In one embodiment, the imaginary object is larger than the object of interest. The imaginary object for example completely surrounds the object of interest. In this case, the projection of the imaginary object into the dimming layer is larger than the projection of the object of interest. This ensures that all of the object of interest is visible by cutting out the dimmed area appropriately.

In one embodiment, the object of interest is a hand and the method further comprises the step of performing tracking of the hand by the mixed reality glasses. This functionality can be part of the software toolkit of the MR glasses. The MR glasses recognize the hand of the user, for example using a camera, and provide the position of the hand in the reference system of the MR glasses. The hand is then projected into the dimming layer to define the dimmed area. The projection of the hand into the dimming layer can be approximated by a projection into the virtual image layer or a generic plane of the MR glasses.

In one embodiment, the dimming intensity gradually increases at a border of the dimmed area. The increase starts at the dimming intensity set for the cut-out part of the dimmed area and ends at the dimming intensity set for the dimmed area outside of the cut-out part. The increase of the dimming intensity can be located outside of the border, such that there is a halo to the outside of the cut-out part, or inside of the border, such that there is a shine into the cut-out part.

In one embodiment, the dimmed area is smaller than an entire display area of the mixed reality glasses. This means that at least a part of the display area is not dimmed, which allows a visual orientation of the user through the MR glasses.

In one embodiment, depth information data provided by a depth sensor of the MR glasses is used for reducing the dimming intensity in the dimmed area. In one example, the presence of an additional object, like a person, located between the virtual object and the MR glasses is detected from the depth information data. In this case, the depth information data represents the distance of the additional object to the MR glasses, and this distance is compared to the distance of the virtual object to the MR glasses. If an additional object is detected between the virtual object and the MR glasses, the dimming intensity of the local dimming is reduced, for example, but not necessarily to zero, either over the whole dimmed area or in a cut-out part covering the projection of the additional object into the dimming layer. The cut-out part can be established in analogy to the disclosure above.

In a second aspect, the invention is directed to a computer program comprising instructions which, when the program is executed by at least one computer, causes the at least one computer to carry out method according to the first aspect.

The computer program in particular comprises instructions which, when the program is executed by a computer, cause the computer to control local dimming of mixed reality glasses, comprising performing of local dimming of a dimmed area, which is a display area of the mixed reality glasses which is occupied by a virtual object, and reducing a dimming intensity of the local dimming in at least a part of the dimmed area.

The invention may alternatively or additionally relate to a (physical, for example electrical, for example technically generated) signal wave, for example a digital signal wave, such as an electromagnetic carrier wave carrying information which represents the program, for example the aforementioned program, which for example comprises code means which are adapted to perform any or all of the steps of the method according to the first aspect. The signal wave is in one example a data carrier signal carrying the aforementioned computer program. A computer program stored on a disc is a data file, and when the file is read out and transmitted it becomes a data stream for example in the form of a (physical, for example electrical, for example technically generated) signal. The signal can be implemented as the signal wave, for example as the electromagnetic carrier wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representative of the aforementioned program, i.e. comprising the program.

In a third aspect, the invention is directed to a computer-readable storage medium on which the program according to the second aspect is stored. The program storage medium is for example non-transitory.

In a fourth aspect, the invention is directed to at least one computer (for example, a computer), comprising at least one processor (for example, a processor), wherein the program according to the second aspect is executed by the processor, or wherein the at least one computer comprises the computer-readable storage medium according to the third aspect.

The computer for controlling local dimming of mixed reality glasses is in particular configured to instruct the mixed reality glasses to perform local dimming of a dimmed area, which is a display area of the mixed reality glasses which is occupied by a virtual object, and to reduce a dimming intensity of the local dimming in at least a part of the dimmed area.

The computer can be part of the mixed reality glasses or can be external to the mixed reality glasses. Alternatively, the computer can be a distributed computer. A part of the distributed computer can be part of the mixed reality glasses and a part of the computer may be external to the mixed reality glasses.

In a fifth aspect, the invention is directed to a system comprising said computer of and mixed reality glasses capable of local dimming.

Definitions

In this section, definitions for specific terminology used in this disclosure are offered which also form part of the present disclosure.
Computer-Implemented Method The method in accordance with the invention is for example a computer-implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein. The signal wave is in one example a data carrier signal carrying the aforementioned computer program. The invention also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

Marker

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

Marker Device

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object. Determining this relative position is also referred to as registering the marker device and the object. The marker device or the object can be tracked, which means that the position of the marker device or the object is ascertained twice or more over time.

Reference Star

A "reference star" refers to a device with a number of markers, advantageously three markers, attached to it, wherein the markers are (for example detachably) attached to the reference star such that they are stationary, thus providing a known (and advantageously fixed) position of the markers relative to each other. The position of the markers relative to each other can be individually different for each reference star used within the framework of a surgical navigation method, in order to enable a surgical navigation system to identify the corresponding reference star on the basis of the position of its markers relative to each other. It is therefore also then possible for the objects (for example, instruments and/or parts of a body) to which the reference star is attached to be identified and/or differentiated accordingly. In a surgical navigation method, the reference star serves to attach a plurality of markers to an object (for example, a bone or a medical instrument) in order to be able to detect the position of the object (i.e. its spatial location and/or alignment). Such a reference star for example features a way of being attached to the object (for example, a clamp and/or a thread) and/or a holding element which ensures a distance between the markers and the object (for example in order to assist the visibility of the markers to a marker detection device) and/or marker holders which are mechanically connected to the holding element and which the markers can be attached to.

Tracking System

A tracking system, such as a medical tracking system, is understood to mean a system which can comprise: a transmitter which emits electromagnetic waves and/or radiation and/or ultrasound waves; a receiver which receives electromagnetic waves and/or radiation and/or ultrasound waves; and an electronic data processing device which is connected to the receiver and/or the transmitter, wherein the data processing device (for example, a computer) for example comprises a processor (CPU), a working memory, a data interface and permanent data memory. The transmitter emits its output onto at least one marker. The signal reflected by the marker is received by the receiver and process by the processor to determine the position of the marker relative to the tracking system.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
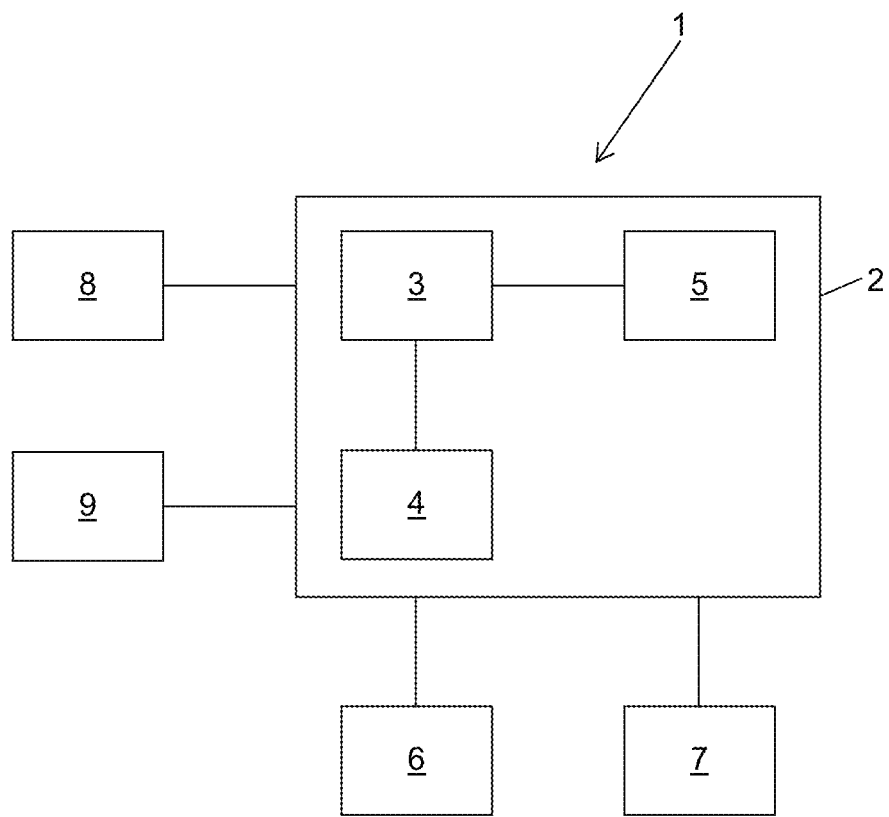
FIG. 1 shows a system according to the present invention.

FIG. 1 is a schematic illustration of a system 1 according to the fifth aspect. The system is in its entirety identified by reference sign 1 and comprises a computer 2. The computer 2 comprise a central processing unit 3, a memory and an interface 5 for connecting the computer 2 to external devices. In the present case, the system further comprises an input unit 6, such as a mouse or a keyboard, an output unit 7, such as a monitor, a tracking system 8 and mixed reality glasses 9, each connected to the computer 2 via the interface 5. The input unit 6, the output unit 7 and the tracking system 8 are optional. The computer 2 can be part of the MR glasses 9. The central processing unit 3 performs all steps for executing the method according to the present invention.

Even though not shown in the figures, the MR glasses 9 comprise a frame such that the MR glasses can be worn by a user and two lenses held by the frame. Each lens is associated to one eye of the user. The user sees his environment, the real world, through the lenses. A virtual image is displayed by each lens, for example using a transparent display on each lens or by projecting the virtual image onto the inside of the corresponding lens. The virtual image thus overlays with the light passing through the lens and entering the user's eye. By providing two slightly different virtual images to the two lenses, a stereoscopic view is achieved.

Each lens further comprises a dimming layer comprising multiple segments which can be dimmed individually. Here dimming means reducing the transmissibility of the segment for light passing through the lens from the outside into the eye of the user. Reducing transmissibility means increasing the opacity of the segment. The dimming layer is for example located within the lens of directly on the inner surface of the lens. A virtual image layer on which the virtual image is displayed is located closer to the user wearing the MR glasses 9 than the dimming layer.

Figure 2:
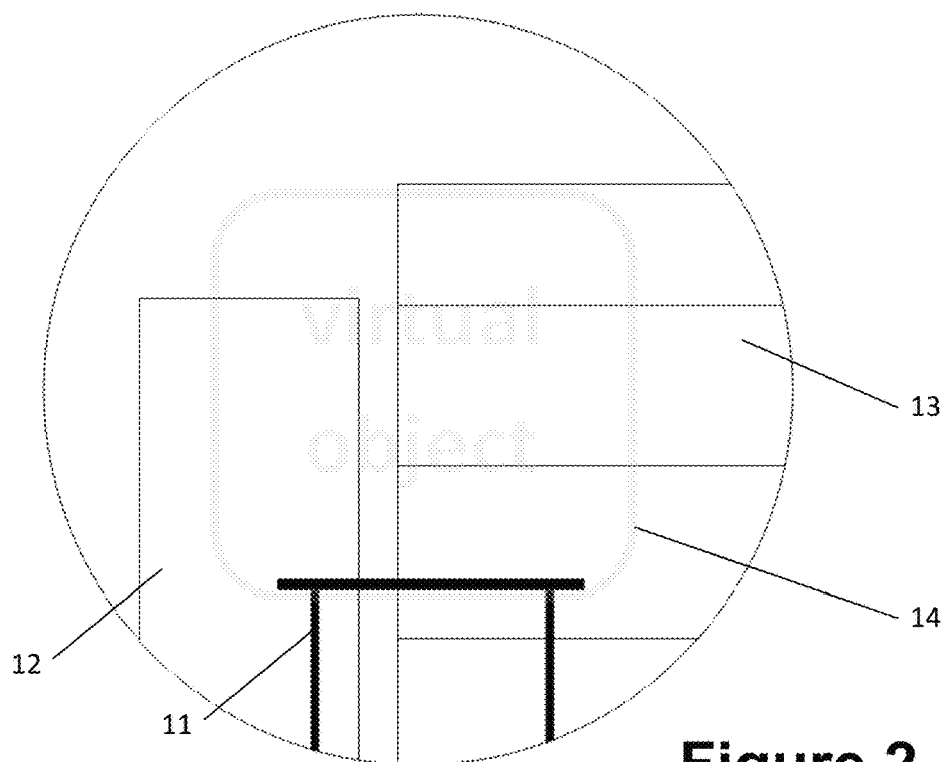
FIG. 2 shows a view through a lens of the MR glasses.

FIG. 2 shows a view through one of the lenses onto a scene in the real world. The scene comprises a table 11, a door 12 and a shelf 13. Overlaid over the scene is a virtual object 14. In the present example, the virtual object is a 2D panel virtually placed in the scene. The limited brightness of the virtual image results in reduced visibility of the virtual object 14.

Figure 3:
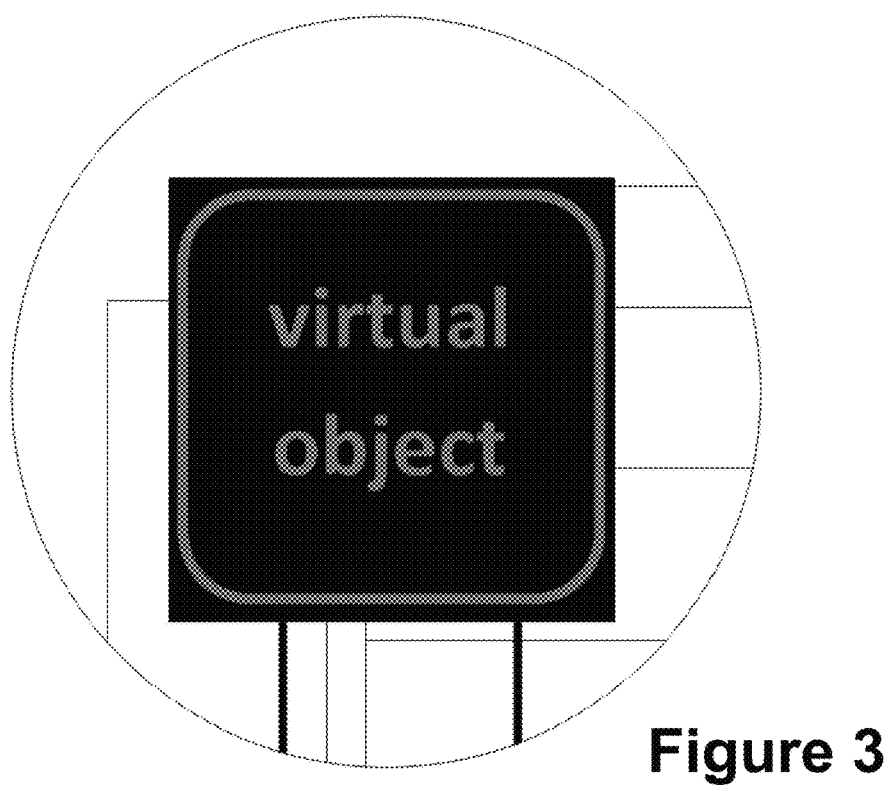
FIG. 3 shows the view of FIG. 2 with local dimming.

FIG. 3 shows the scene of FIG. 2 with local dimming activated. A dimmed area of the dimming layer covering the virtual object is dimmed to maximum opacity. The virtual object becomes clearly visible, but parts of the scene are no longer visible to the user, like any objects on the table 11. In addition, blocking a major part of the scene can cause loss of orientation and loss of spatial awareness of objects in close proximity of the user.

Figure 4:
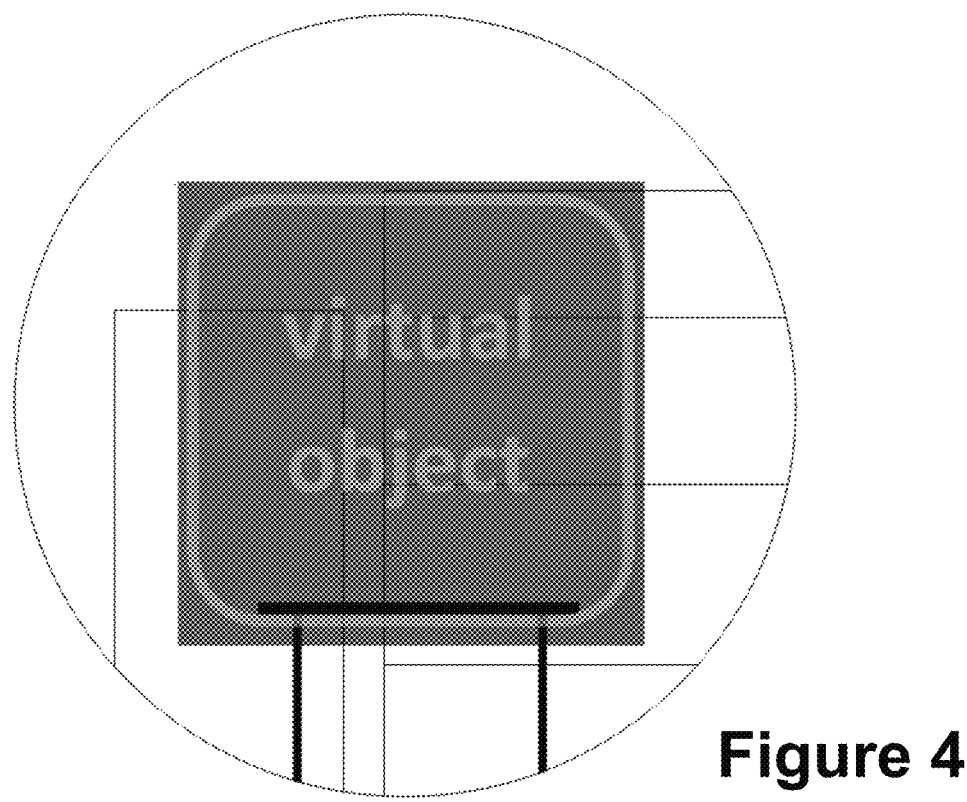
FIG. 4 shows the view of FIG. 3 with reduced dimming intensity.

FIG. 4 shows the view of FIG. 3, but with reduced dimming intensity of the dimmed area. The visibility of the virtual object slightly decreases, but the background of the scene behind the virtual object 14 becomes perceivable.

Figure 5:
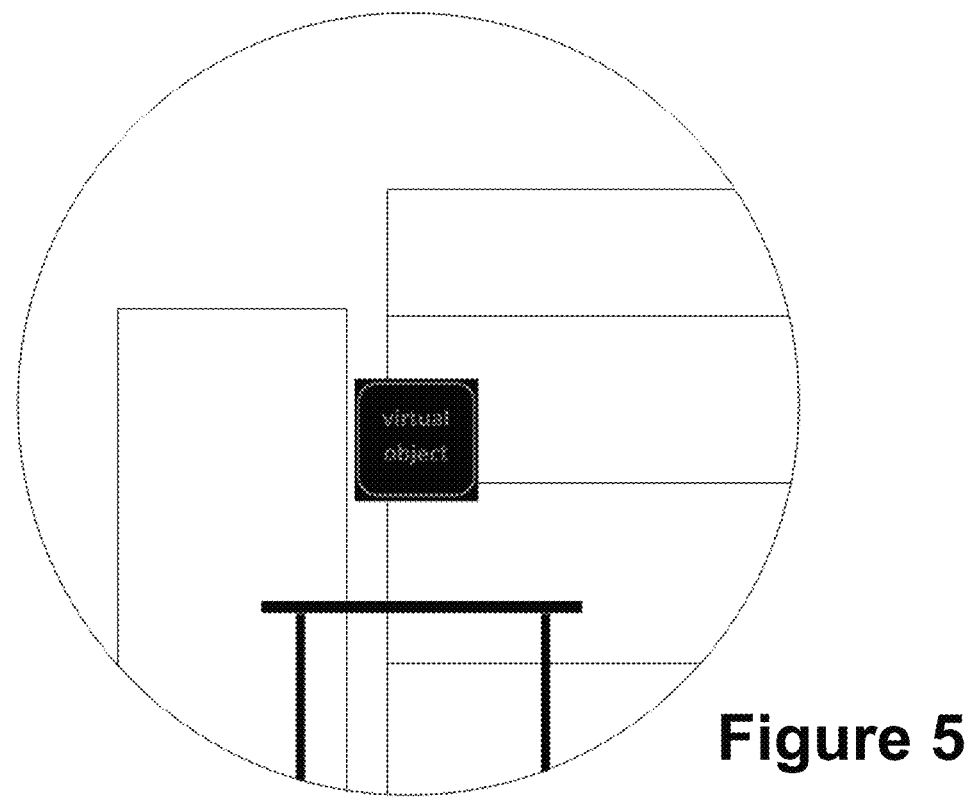
FIG. 5 shows a view with a smaller virtual object.

FIG. 5 shows the scene of FIG. 3, but with the virtual object 14 being smaller than in FIG. 3. In this case, the local dimming does not obstruct much of the scene, such that the local dimming can be maintained with full opacity without affecting the user.

Figure 6:
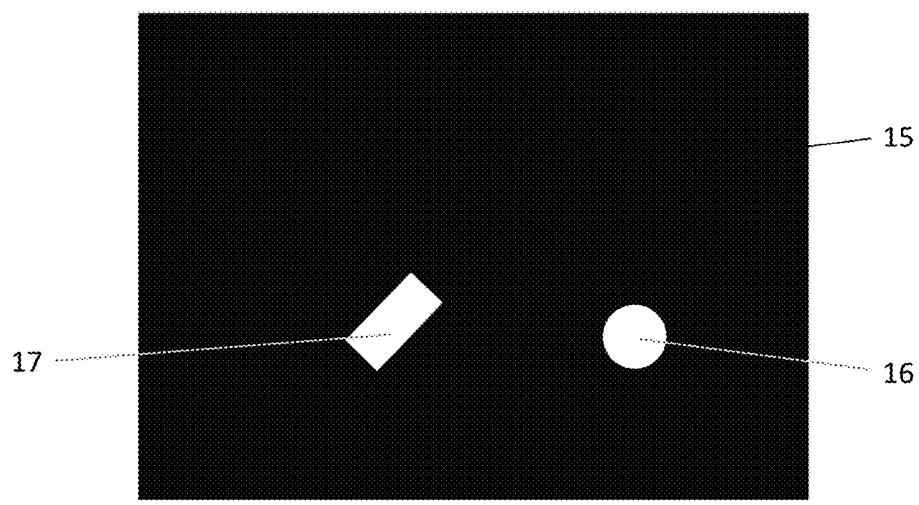
FIG. 6 shows a dimmed area with a cut-out part.

FIG. 6 schematically shows a dimmed area 15 with a cut-out part having two sections 16 and 17. The cut-out part is a part of the dimmed area 15 in which the local dimming would be applied due to the projection of a virtual object into the dimming layer, but is reduced or even entirely switched off to make objects of interest behind the virtual object visible to the user. In the present example, section 16 belongs to a hand of the user and section 17 belongs to a medical instrument.

The hand of the user is tracked by the MR glasses 9, for example using built-in functionality. A spherical imaginary object being larger than the hand is virtually placed around the hand and projected into the dimming layer to calculate the corresponding section 16 of the cut-out part.

The medical instrument comprises a marker device which is tracked by the tracking system 8. The position of the marker device is established in the reference system of the medical tracking system. In addition, the relative position between the reference system of the MR glasses 9 and the reference system of the tracking system 8 is established. Based on those data, the position of the marker device in the reference system of the MR glasses 12 is calculated. Since the medical instrument is registered with the marker device, the position of the medical instrument relative to the marker device is known, and thus the position of the medical instrument in the reference system of the MR glasses 9 can be calculated. Based on this position and the known shape of the medical instrument, the medical instrument can be projected into the dimming layer to establish the corresponding section 17 of the cut-out part of the dimmed area 15.

Figure 7:
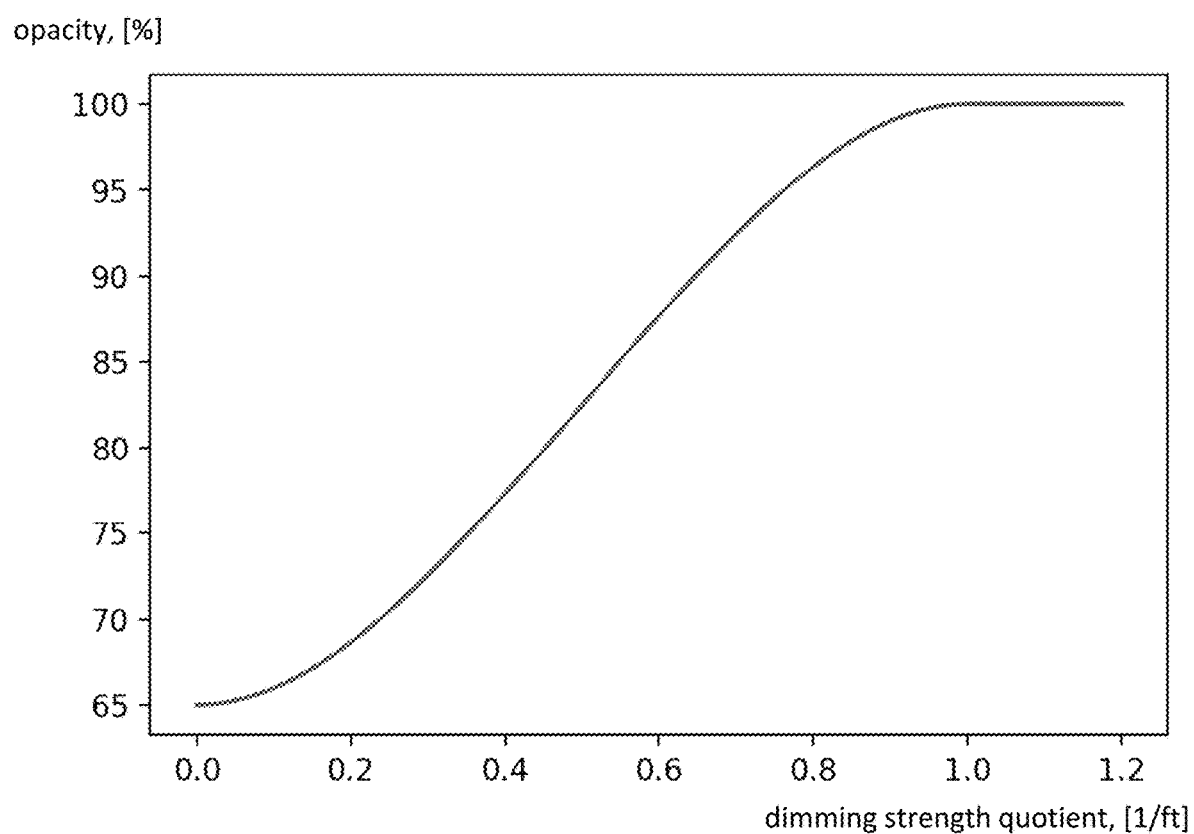
FIG. 7 shows a dimming intensity curve.

FIG. 7 shows a dimming intensity curve, which represents the dimming intensity, or opacity, of the dimmed area over a dimming strength quotient. The dimming strength quotient is calculated as $$\frac{\text{distance}}{\text{size} \times 0.8},$$

wherein "distance" is the distance of the virtual object from the MR glasses 9 and "size" is the virtual size of the virtual object. In this context, the size means the two-dimensional extent of the virtual object in two directions orthogonal to each other and orthogonal to the viewing direction of the user onto the virtual object. In the case of a two-dimensional panel as the virtual object, which directly faces the user, the size of the virtual object is the width times the height of the panel.

As can be seen from FIG. 7, the opacity starts at 65 percent for a very large and/or a very close virtual object, which means a virtual object that covers most of the scene. Full opacity is reached for a dimming strength quotient of about 1.0 1/ft. and remains at the maximum from there on.

Figure 8:
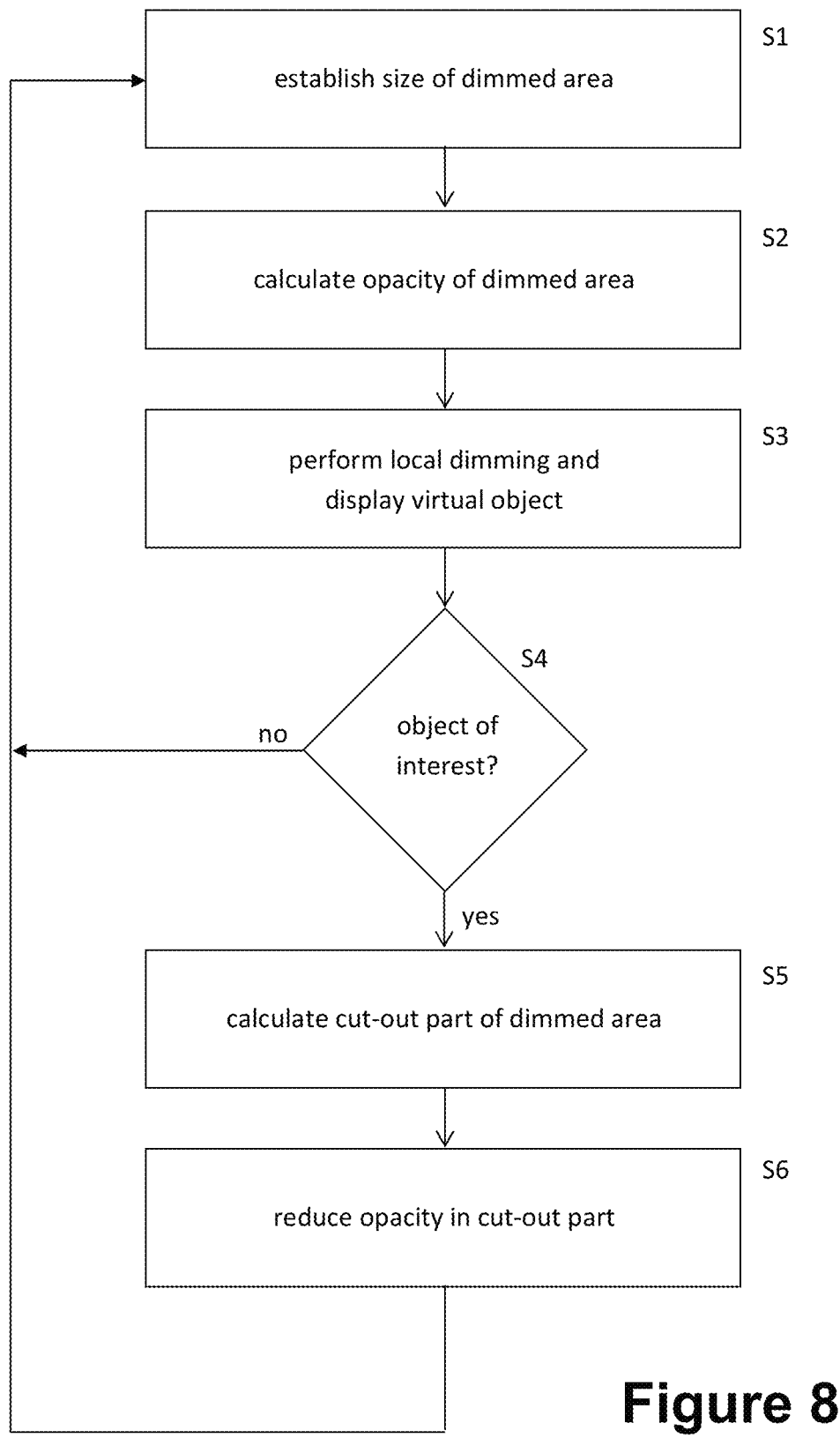
FIG. 8 shows a flow diagram of the method.

FIG. 8 shows a flow diagram of the method according to the present invention.

The method starts at step S1 with establishing the size and the position of a dimmed area corresponding to a virtual object to be displayed by the mixed reality glasses. The dimmed area is constituted by one or more segments of the dimming layer of the MR glasses. In one example, the dimmed area is formed by every segment covered at least partly by the projection of the virtual object into the dimming layer.

At step S2, the opacity of the dimmed area is calculated, for example from the size of the dimmed area or the size and the distance of the virtual object to the MR glasses.

At step S3, local dimming is performed, which means that every segment of the dimming layer belonging to the dimmed area is dimmed to the opacity calculated in step S2.

At step S4, it is determined whether or not there is an object of interest, which is an object which should be visible to the user. If there is no object of interest, the process returns to step S1.

If there is an object of interest, the process continues with step S5 of calculating a cut-out part of the dimmed area. This might involve projecting the object of interest into the dimming layer and assigning each element of the dimming layer covered by at least a part of the projection to the cut-out part.

At step S6, the opacity of the dimmed area is reduced in the cut-out part of the dimmed area, either to zero or a non-zero value smaller than the opacity outside of the cut-out part. The process then returns to step S1.

The steps of the flow diagram can be performed in a different order as long as this makes technical sense. In addition, one or more steps are optional. For example, the block comprising steps S1 to S3 or the block comprising steps S4 to S6 is optional.

The invention claimed is:

1. A method of controlling local dimming of mixed reality glasses, comprising:

performing of local dimming of a dimmed area, which is a part of a display area of the mixed reality glasses which is occupied by a virtual object, and reducing, based on determining that at least a part of the dimmed area, which is the part of the display area of the mixed reality glasses which is occupied by the virtual object, reduces visibility of a real-world object, a dimming intensity of the local dimming in at least the part of the dimmed area, wherein reducing the dimming intensity involves cutting out a part of the dimmed area which covers an object of interest, and wherein cutting out a part of the dimmed area includes:

placing an imaginary object around the object of interest wherein the imaginary object is larger than the object of interest, calculating a projection of the imaginary object into the dimmed area, and reducing the dimming intensity of segments of the dimmed area which overlap with the projection.

2. The method of claim 1, wherein reducing the dimming intensity involves monotonically reducing the dimming intensity with an increasing size of the dimmed area.

3. The method of claim 2, wherein the size of the dimmed area is calculated from a distance of the virtual object to the mixed reality glasses and a size of the virtual object.

4. The method of claim 1, wherein reducing the dimming intensity involves setting the dimming intensity in a range from 65 percent to 100 percent of a maximum dimming intensity.

5. The method of claim 1, wherein the virtual object is a 2D panel.

6. The method of claim 1, wherein cutting out a part of the dimmed area means setting the dimming intensity in the cut-out part of the dimmed area to zero.

7. The method of claim 1, wherein the imaginary object is larger than the object of interest.

8. The method of claim 1, wherein the object of interest is a hand or a medical instrument.

9. The method of claim 8, wherein the object of interest is the hand and the method further comprises the step of performing tracking of the hand by the mixed reality glasses.

10. The method of claim 1, wherein the dimming intensity gradually increases at a border of the dimmed area.

11. The method of claim 1, wherein the dimmed area is smaller than an entire display area of the mixed reality glasses.

12. A non-transitory computer readable storage comprising instructions which, when executed by a computer, cause the computer to control local dimming of mixed reality glasses, comprising:

performing of local dimming of a dimmed area, which is a part of a display area of the mixed reality glasses which is occupied by a virtual object, and reducing, based on determining that at least a part of the dimmed area, which is the part of the display area of the mixed reality glasses which is occupied by the virtual object, reduces visibility of a real-world object, a dimming intensity of the local dimming in at least the part of the dimmed area, wherein reducing the dimming intensity involves cutting out a part of the dimmed area which covers an object of interest, and wherein cutting out a part of the dimmed area includes:

placing an imaginary object around the object of interest wherein the imaginary object is larger than the object of interest, calculating a projection of the imaginary object into the dimmed area, and reducing the dimming intensity of segments of the dimmed area which overlap with the projection.

13. A computer for controlling local dimming of mixed reality glasses, the computer configured to instruct the mixed reality glasses to:

perform local dimming of a dimmed area, which is a part of a display area of the mixed reality glasses which is occupied by a virtual object, and reduce, based on determining that at least a part of the dimmed area, which is the part of the display area of the mixed reality glasses which is occupied by the virtual object, reduces visibility of a real-world object, a dimming intensity of the local dimming in at least the part of the dimmed area, wherein reducing the dimming intensity involves cutting out a part of the dimmed area which covers an object of interest, and wherein cutting out a part of the dimmed area includes:

placing an imaginary object around the object of interest wherein the imaginary object is larger than the object of interest, calculating a projection of the imaginary object into the dimmed area, and reducing the dimming intensity of segments of the dimmed area which overlap with the projection.

* * * * *